US006397245B1

(12) United States Patent
Johnson, II et al.

(10) Patent No.: US 6,397,245 B1
(45) Date of Patent: May 28, 2002

(54) SYSTEM AND METHOD FOR EVALUATING THE OPERATION OF A COMPUTER OVER A COMPUTER NETWORK

(75) Inventors: Peter Christopher Johnson, II, Colorado Springs, CO (US); Brian James DeHamer, Santa Clara; Curtis Timothy Gross, Rocklin, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/333,309

(22) Filed: Jun. 14, 1999

(51) Int. Cl.[7] .............................................. G06F 15/16
(52) U.S. Cl. ........................ 709/203; 709/223; 709/224
(58) Field of Search ................................ 709/223, 224, 709/203, 201

(56) References Cited

U.S. PATENT DOCUMENTS

| 6,021,437 A | * | 2/2000 | Chen et al. .................. 709/202 |
| 6,131,118 A | * | 10/2000 | Stupek et al. ................ 709/223 |
| 6,145,001 A | * | 11/2000 | Scholl et al. ................. 709/203 |
| 6,145,096 A | * | 11/2000 | Bereiter et al. ................ 714/25 |
| 6,167,448 A | * | 12/2000 | Hemphill et al. ......... 707/501.1 |
| 6,269,330 B1 | * | 7/2001 | Cidon et al. ................. 370/248 |
| 6,308,205 B1 | * | 10/2001 | Carcerano et al. .......... 709/220 |
| 6,317,788 B1 | * | 11/2001 | Richardson ................. 709/224 |

* cited by examiner

Primary Examiner—Mehmet B. Geckil

(57) ABSTRACT

The invention permits a user, such as a network administrator, to remotely initiate and control the diagnostics of a node of a networked computer system. This diagnostic control is performed by the user selecting a diagnostic routine that is to be executed. This diagnostic routine instructs the managed node to collect configuration or other data and report this data back to the diagnostic control, which is then reported back to the user. In accordance with one aspect of the invention, the system includes a management client executing a user interface, such as a Web browser. The system also includes a management server executing a Web server, wherein the Web server is configured to be invoked by the user interface (e.g., by specifying a URL). The management server further includes software for dynamically serving data to the Web server, and at least one diagnostic control (e.g., COM object) that defines a plurality of diagnostic steps to perform on a managed object. Finally, the system includes a managed object (e.g., a network node) having data control software configured to collect data from the managed object in response to specific requests made by the diagnostic control. Preferably, the data control software is configured reports the collected data back to the diagnostic control over the computer network.

21 Claims, 9 Drawing Sheets

SYSTEM AND METHOD FOR EVALUATING THE OPERATION OF A COMPUTER OVER A COMPUTER NETWORK

BACKGROUND OF THE INVENTION

1. Field of the Invention

The present invention generally relates to networked computer systems, and more particularly to a system and method for evaluating the operation of a computer over a computer network.

2. Discussion of the Related Art

In recent years, the proliferation of computers and advances in computing technology have had a profound impact on the way in which companies communicate, maintain records, and conduct business generally. Computer networks have been utilized to such great extent that email is rapidly replacing the telephone for many communications. Increased sophistication in computer systems has enhanced the way that many companies conduct business. Indeed, except for very small businesses, virtually all business environments have networked computer systems. With the ever-increasing complexity of computer systems, a computer specialist (often called a network administrator) is often employed to maintain proper working operation of a computer network, and to troubleshoot, diagnose, and correct problems that arise.

It is common for computer systems, in particular local area networks (LANs), to have numerous errors, the majority of which require different messages to be sent to the user and the occurrence and performance of many different complex actions for recovery. These errors result from a variety of conditions, including configuration errors, hardware errors and communication errors.

At present, error analysis and problem resolution is often handled manually by network administrators. There are, however, problems with this approach. For example, the network administrator generally must troubleshoot the problem at the workstation that is experiencing the problem. In networks that are rather disperse (perhaps across buildings in different geographic locations), then additional costs are realized in the form of travel time and expenses for the network administrator, or in keeping multiple network administrators on staff (to service different locations).

In addition, the troubleshooting process itself is rather time-consuming, as it is typically performed in small incremental steps. For example, suppose a workstation received some sort of network connectivity error. The network administrator may troubleshoot this problem by first evaluating the internal configuration of the workstation. Thereafter, the network administrator may control the workstation to perform incremental network transmissions (e.g., using a utility program such as "Ping"). Sometimes, troubleshooting requires a rather tedious trial and error method of diagnosis.

As will be appreciated, this type of error diagnosis often requires that the network administrator possess a relatively high level of knowledge and sophistication, at least with regard to computer systems. As a result, such network administrators generally command a higher salary, and therefore a higher expense.

Accordingly, it is desired to provide a system that offers improved capability and flexibility for diagnosing and troubleshooting computer problems in a networked computer environment that eliminates, or at least reduces, the shortcomings noted above.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for evaluating the operation of a managed object (e.g., node) in a computer network environment. Broadly, the invention permits a user, such as a network administrator, to remotely initiate and control the diagnostics of a node of a networked computer system. This diagnostic control is performed by the user selecting a diagnostic routine that is to be executed. This diagnostic routine instructs the managed node to collect configuration or other data and report this data back to the diagnostic control, which is then reported back to the user.

In accordance with one aspect of the invention, the system includes a management client executing a user interface, such as a Web browser. The system also includes a management server executing a Web server, wherein the Web server is configured to be invoked by the user interface (e.g., by specifying a URL). The management server further includes software for dynamically serving data to the Web server, and at least one diagnostic control (e.g., COM object) that defines a plurality of diagnostic steps to perform on a managed object. Finally, the system includes a managed object (e.g., a network node) having data control software configured to collect data from the managed object in response to specific requests made by the diagnostic control. Preferably, the data control software is configured reports the collected data back to the diagnostic control over the computer network.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
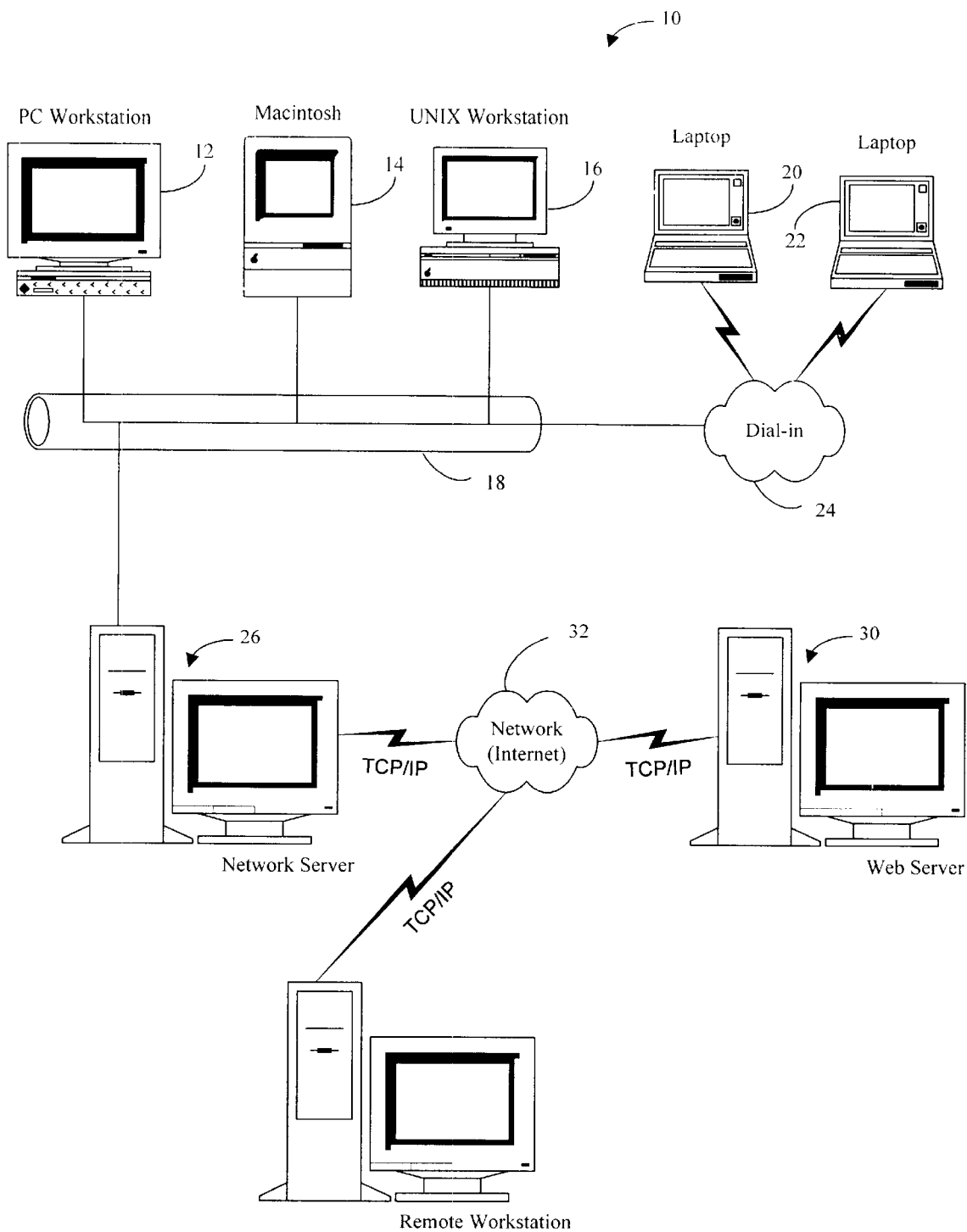
FIG. 1 is a block diagram illustrating the physical components in a networked computer environment.

Having summarized various aspects of the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DEFINITIONS

Before describing the preferred embodiment of the present invention, several definitions are set out immediately below. To the extent that these terms may have a particular meaning, as a term or art or otherwise, that differs from the definitions set out below, the following definitions shall control the interpretation and meaning of the terms as used within the specification and claims herein, unless the specification or claims expressly assigns a differing or more limited meaning to a term in a particular location or for a particular application.

ACTIVE SERVER PAGE (ASP) is an easy-to-learn scripting interface along with a number of predefined objects that simplify many development tasks—such as maintaining user state and defining global variables within an application. Microsoft's ASP was designed specifically to simplify the process of developing Web applications, and is built into Internet Information Server (defined below) Version 3.0 and later. ASP is similar in concept to Allaire's Cold Fusion and Netscape's server-side JavaScript, and it is an alternative to conventional CGI scripting using Perl or C scripts.

APPLET is a segment of code that can be executed on a client machine under supervision of a Web browser. The term applet is especially used to refer to such segments as they are instantiated in the Java programming environment. Typically applets are distributed via the World Wide Web as embedded objects in HTML (defined below) documents.

BROWSER is a generic term for a device or platform that allows a user to view a variety of service collections. When used in the context of an Internet service, a browser is that tool that downloads and interprets HTML code, and displays the interpreted result on a client workstation display.

COMPONENT OBJECT MODULE (COM) is a specification developed by Microsoft for building software components that can be assembled into programs or add functionality to existing programs running on Microsoft Windows platforms, to define the interaction between objects in the Windows environment.

DISTRIBUTED COMPONENT OBJECT MODULE (DCOM) is the version of Microsoft's Component Object Module specification that stipulates how components communicate over Windows-based networks. DCOM permits the distribution of different components for a single application across two or more networked computers, running an application distributed across a network so that the distribution of components is not apparent to the user, and remotely displaying an application.

HYPERTEXT MARKUP LANGUAGE (HTML) is a document markup language, typically interpreted by Web browsers, that instructs a browser how to present a particular display. An HTML file is in ASCII format. In this regard, an HTML file includes codes that specifies fonts, defines text, formatting, and codes that ultimately define how information is to be presented at a client workstation. HTML documents may also embed objects such as graphic files or applets.

HYPERTEXT TRANSFER PROTOCOL (HTTP) defines how information transactions are conducted between a client Web browser and a Web datastore server.

HTTP messages are transferred under the auspices of TCP/IP (defined below).

INTERNET—An "internet" is a collection of isolated smaller networks into a larger, interconnected entity via the use of an underlying protocol and equipment that employs that protocol. In common usage, "the Internet"(with a capital I) is the wellknown, much publicized worldwide collection of computers and network equipment that use the Internet Protocol (IP, defined below) to communicate with one another.

INTERNET INFORMATION SERVER (IIS) is Microsoft's brand of Web server software, which utilizes HTTP to deliver World Wide Web documents. IIS incorporates various functions for security, allows for CGI programs, and also provides for Gopher (e.g., an Internet utility for finding text information and presenting it to the user in hierarchical menu format) and FTP servers. IIS is presently the only Web server that supports ASP.

INTERNET PROTOCOL, or IP, is the result of an effort begun by the U.S. Defense Department in 1969 to allow the interconnection of isolated computers into an automated and resilient network. The evolution of these efforts is expressed in document RFC-791, which is maintained by the Internet Engineering Task Force. Moving from early military applications, into university and educational environments, and finally into the commercial mainstream, IP is now well-established as the global internetworking protocol.

PROTOCOL is a "formal description of message formats and the rules two or more machines must follow to exchange those messages"(Douglas Comer, author of several textbooks). Well-written protocols have a precise, narrow definition of their scope; this allows easy combinations with other protocols to accomplish a broader-scoped task while maintaining tremendous flexibility.

NETWORK is a collection of two or more computing devices that are interconnected through a common electrical medium and message protocol, in such a way that allows any of the two or more computing devices to communicate. Unless specifically used differently herein, a network may comprise a local area network (LAN) or a wide area network (WAN). Indeed, the Internet is probably the best known example of a network.

TRANSMISSION CONTROL PROTOCOL (TCP) is a suite of transport-layer services that define a reliable, connection-oriented protocol. The common phrase "TCP/IP" emphasizes the dependency that TCP (data transmission) has on the supporting IP (interconnection). Computers connecting to the Internet employ this protocol in order to communicate most data transactions; HTTP is one example.

UNIFORM RESOURCE LOCATOR (URL) is an addressing scheme that identifies a specific location of a Web resource. A fully qualified URL defines the protocol (such as FTP or HTTP), computer name, and specific file on that computer that embodies a Web document.

WORLD WIDE WEB (WEB) is the total set of interlinked (via the Internet) hypertext documents residing on HTTP servers all around the world and the client hosts running browsers that can access those servers. Documents on the World Wide Web, called pages or Web pages, are written in HTML, identified by URLs, and transmitted from node to node to the end user under HTTP. In general, "the Web" is a subset of all the computers that exist on the "Internet".

Turning now to the drawings, FIG. 1 is a diagram of a networked system configuration, generally designated by reference numeral 10, which may provide the working environment of the present invention. While the system configuration could take many forms, the diagram of FIG. 1 illustrates a plurality of diverse workstations 12, 14, and 16 directly connected to a network 18, such as a LAN. Additional workstations 20, 22 may similarly be remotely located and in communication with the network 18 through a dial-in connection 24. Each of the workstations 12, 14, 16, 20, 22 in the figure are uniquely illustrated to emphasize that the workstations may comprise a diverse hardware platform. For example, a first workstation 12 may be a personal computer utilizing a Pentium processor chip set and running Windows operating system environments (e.g., Win 95/98, Win NT, etc.). The second and third workstations 14, 16 could be similar workstations, or diverse workstations, such as Apple Macintosh and/or UNIX-based workstations.

As is now well known, browser applications are provided and readily available for a variety of hardware platforms. Browsers are most commonly recognized for their utility in accessing information over the Internet. Consistent with its previously stated definition, a browser is a device or platform that allows a user to view a variety of service collections. A browser retrieves information from a Web server using HTTP, then interprets HTML code, formats and displays the interpreted result on a workstation display. Typically, Web browsers are implemented to ignore data or instructions which they do not recognize or otherwise know how to display. It is the use of such robust and commonly available features that permits a system administrator to carryout the diagnostic capabilities of the preferred embodiment of the invention, from a remote location, and perhaps even across a variety of hardware platforms.

In one environment, the workstations 12, 14, 16 disposed along the network 18 may be various workstations in a corporate environment. Each of the workstations 12, 14, 16 are interconnected through the network 18, as described, and are further connected to a network server 26. In a manner that is well known in the art, and thus need not be described herein, the network server 26 controls the access to, and interaction of the workstations along, the network 18.

In the preferred embodiment of the present invention, a Web server 30 is also provided. The Web server 30 is connected on one side to a network 32, such as the Internet or an intranet. In turn, the Web server 30 communicates with the network server 26 using TCP/IP protocol 32. It will be appreciated that, although the network server 26 and the Web server 30 are depicted as two distinct machines, they could be implemented on a single hardware platform. As will be appreciated by persons skilled in the art, the Web Server 30 "serves up" Web page(s) to a browser that requests the page(s) by specifying their location(s) with a URL.

As is known, browsers can be given extra capabilities that go beyond simple static browsing. In the preferred embodiment of the present invention, and as will be discussed in more detail below, an initial page that is presented to a user (e.g., the System Administrator) may be a static HTML listing of diagnostics that may be executed. Each diagnostic in the listing has an associated link to an ASP script. By "clicking on" or otherwise selecting one of these links, the system executes that particular ASP script.

Before discussing the implementation details of the preferred embodiment of the present invention, reference is first made to FIGS. 2 through 5, which are exemplary screen displays that may be presented to a System Administrator by one embodiment of the present invention. In these drawings, text that is presented in underlining, corresponds to text that is presented by most Web browsers in blue text, which is a hyperlink to another Web page.

Figure 2:
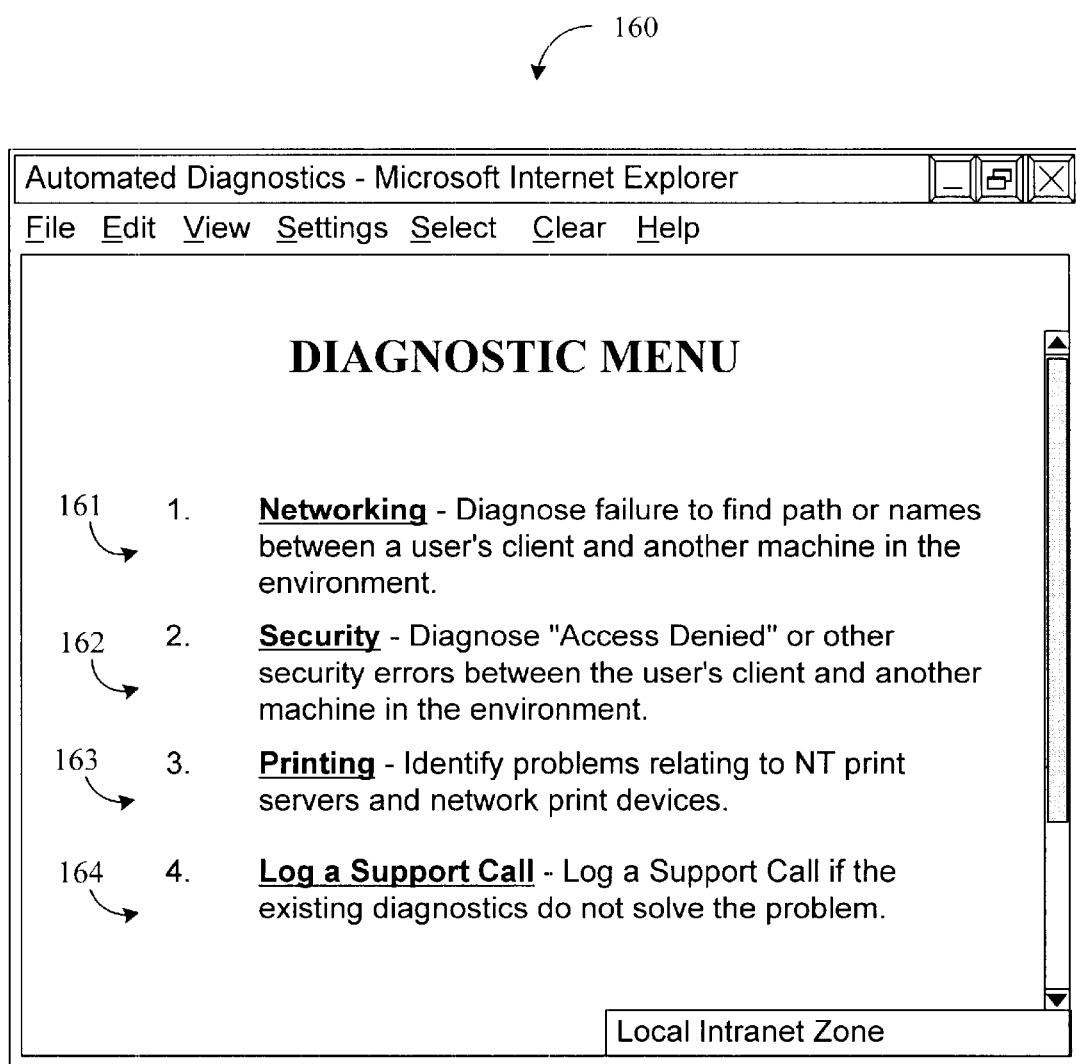
FIGS. 2–5 are diagram illustrating exemplary screen displays that may be presented to a user of a system of the present invention.

When a user, from a user interface 102 such as a browser, directs the browser (using a URL) to the location of a Web page that provides diagnostics in accordance with the present invention, a screen 160, such as that illustrated in FIG. 2, may be "served up" to the browser. The presentation of such a Web page may be predefined by HTML code to present a list of possible diagnostic routines that the user may select for execution. In one embodiment, the specific diagnostic routines provided in this list may be utilized to diagnose or troubleshoot a class of problems. Such problems may include, for example, networking problems 161, security problems 162, printing problems 163, or other comparable classes of problems. In addition, the one embodiment may provide an option to a user to log a call for a support person 164 to manually diagnose the problem, in the event that the diagnostics of the present invention are unable to satisfactorily diagnose the problem. Preferably, each diagnostic routine may be listed in connection with a hyperlink, which may be selected by a user simply by pointing the mouse arrow to the hyperlink, and clicking on the hyperlink, in a manner that is well known by persons in the art. When such an action is performed, the browser instructs the Web server 130 on a management server (discussed in more detail below) to serve up another Web page that is more particularly associated with the diagnostic routine selected by the user.

Figure 3:
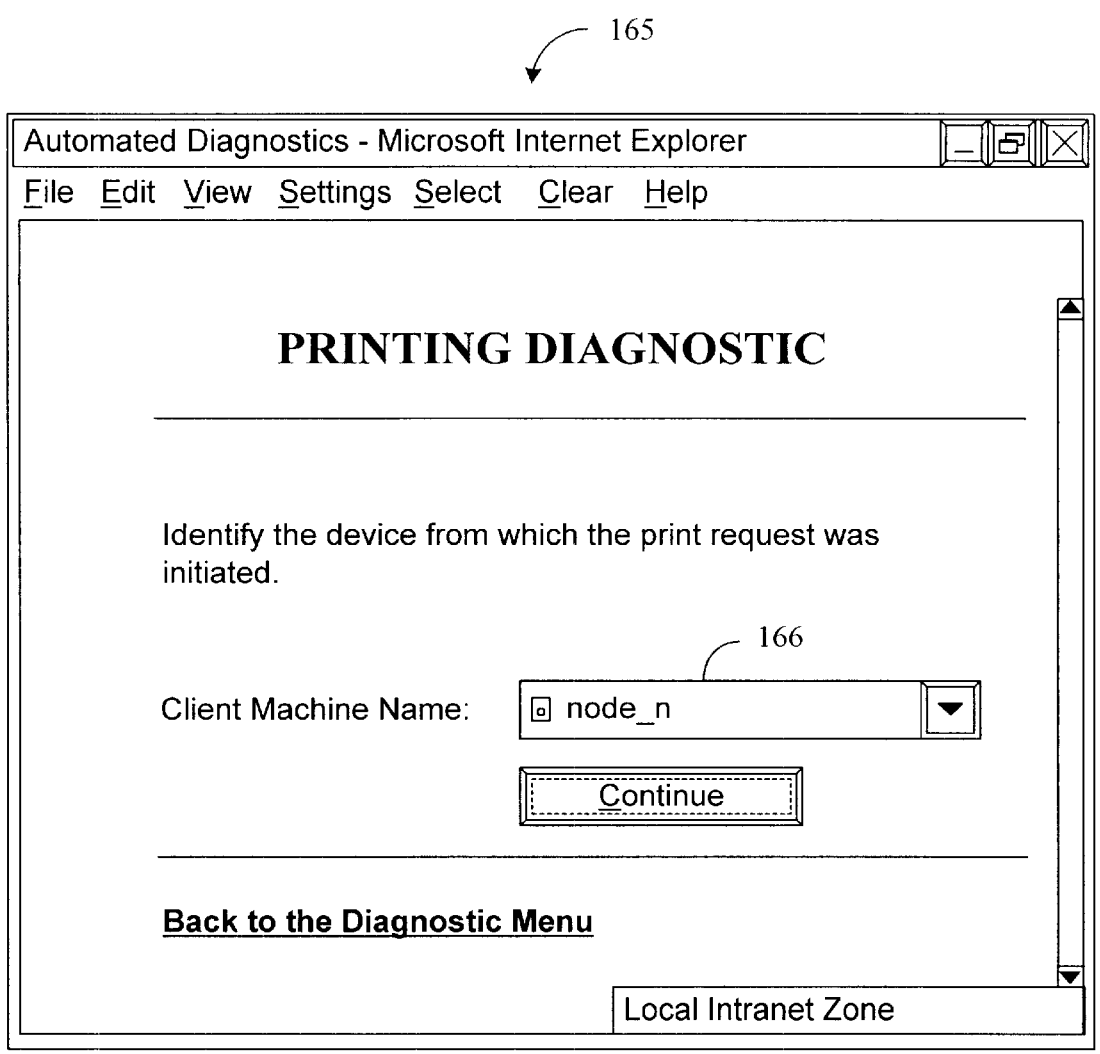
Figure 4:
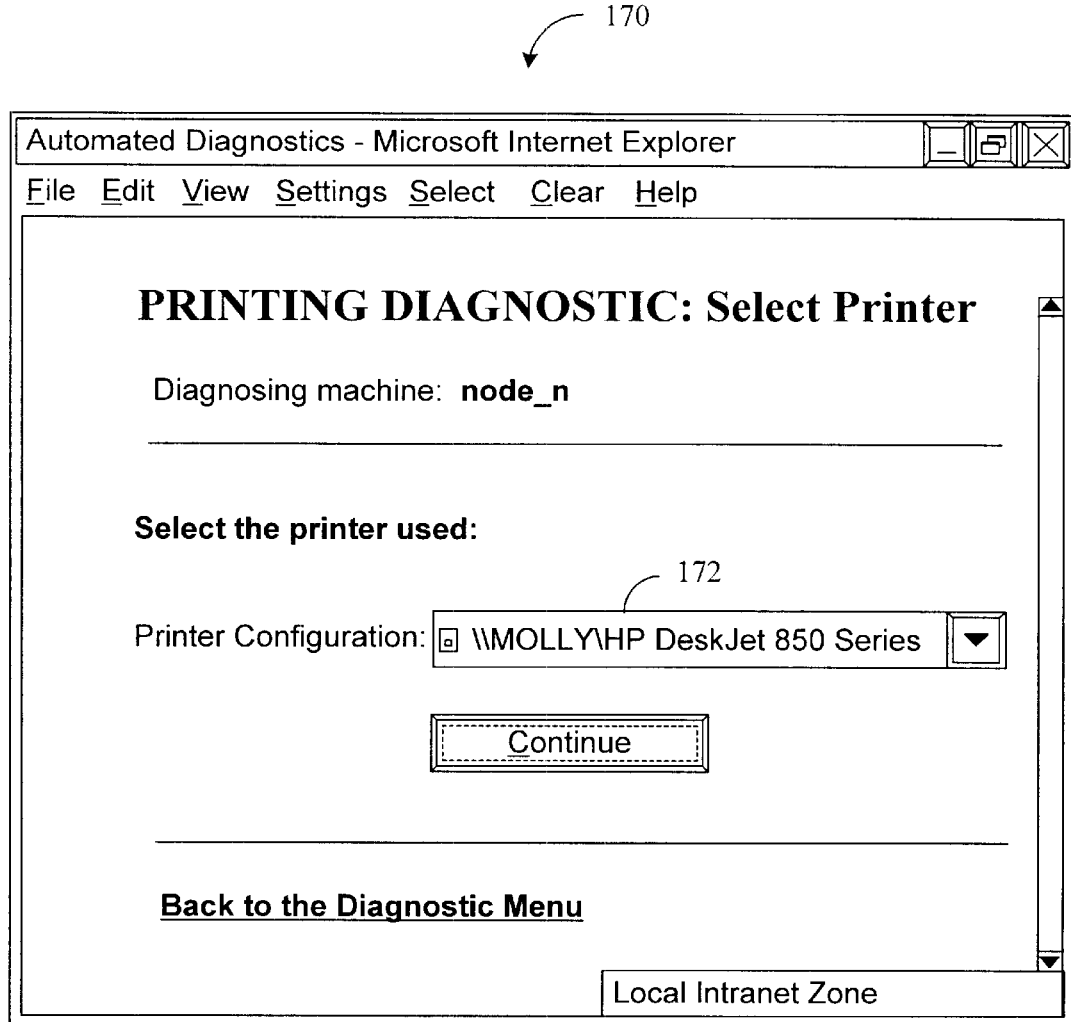

The user may then be presented with a screen 165, like the one illustrated in FIG. 3. Assuming the user selected the diagnostic routine for diagnosing printing errors, then a screen 165 such as that in FIG. 3 may be presented to the user, whereby the user is requested to identify the particular node 166 or device that is to be diagnosed. Typically this would be a device or node that had attempted to carry out a print operation, and was unsuccessful. As will be appreciated, the name of the device may be the device identifier, as identified by the network server. Typically the names of such devices will be known by the network administrator. However, consistent with the broader concepts of the invention, the ASP script could be designed to present a listing of possible device names to the network administrator to select from. Once the requesting device has been identified, then a data control on that device may be invoked to obtain a list of devices (e.g., printers) that are configured there. Thereafter, a screen display 170 such as that of FIG. 4 might be presented to the user. In this screen display, the user may be prompted to identify the printer 172 that was the intended destination of the unsuccessful print operation. The identity of the printer may be presented from a listing of possible printers (obtained from the data control) to the system administrator, who may make a selection from this listing. Thereafter, the present invention, in a manner that will be discussed in more detail below, may perform its diagnostic services, and within the matter of a few moments present a screen display 175 to the user like that illustrated in FIG. 5.

Figure 5:
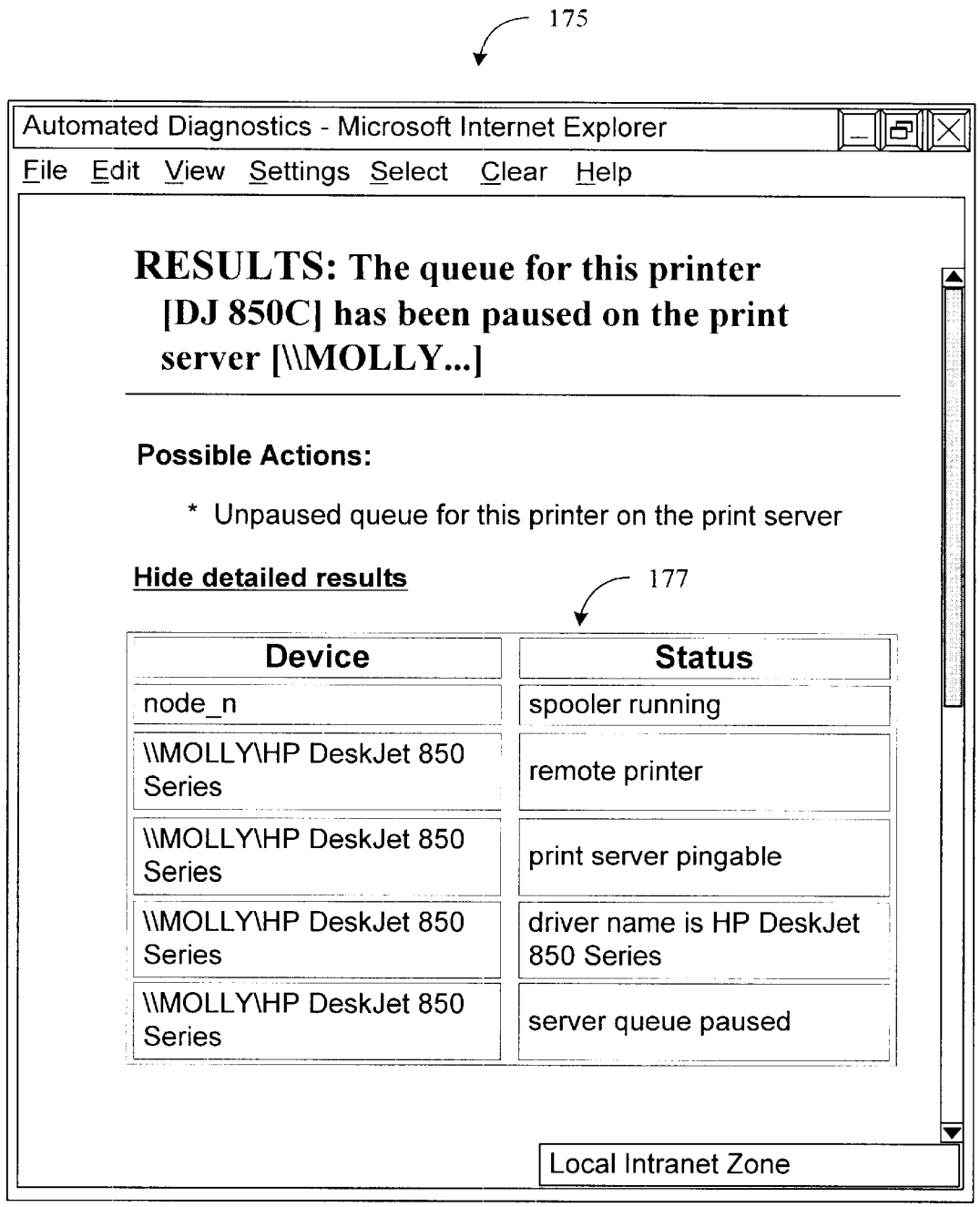

Specifically, the invention may compile a screen that illustrates the various steps performed by the diagnostic routine of the present invention and the status or result of each step. By way of simple illustration, the drawings illustrate the selection of a requesting device called node_n, being diagnosed in connection with print operations sent to a printer identified as Molly/HP Desk Jet 850 Series. As illustrated in FIG. 5, the results 177 may be presented to the user. As shown, the results indicated that the node_n device had a spooler running, and that the HP Desk Jet 850 Series printer was a remote printer. It might further indicate that the print server was "pingable." It may then identify the driver name for the printer, and ultimately indicate that the server queue was paused. From this information, the system administrator can determine that a solution to the problem may be to simply correct whatever has caused the server queue to pause.

It should be appreciated that the example presented above was presented merely for purposes of illustrating certain steps involved with the use of one embodiment of the present invention. It will be appreciated that an exhaustive discussion of how a system of the present invention is to be used is not needed herein as, indeed, the manner in which the present invention is used need not be described herein in order to understand the function, operation, and implementation of a system and method of the present invention. It will be appreciated, however, that a system of this type provides various benefits such as ease of use, and consistent diagnosis and data collection. Specifically, a system of this type is very easy for a system administrator to use, in that the system administrator is guided through a set of rather simple question and answer dialog during the course of the diagnosis. Further, and regardless of the level of skill of the person attempting to perform the diagnosis, the various logical components invoked by the system of the present invention execute in the same fashion. For the less experienced system administrator, this allows him/her to solve problems that he/she may otherwise not be able to solve. For the more experienced person, data is collected and analyzed for them, reducing the amount of time the person must spend on a particular problem. Furthermore, the system and method of the present invention allows the system administrator to perform the diagnosis from virtually any location, including a location that is remote from the equipment being diagnosed.

Figure 6A:
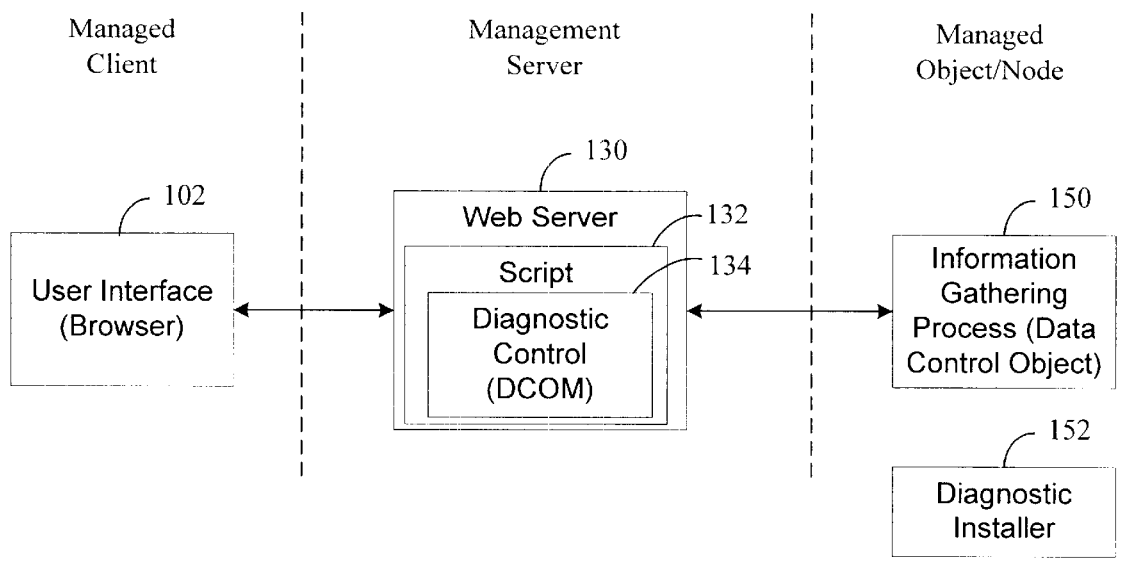
FIGS. 6A and 6B are block diagrams illustrating principal components of a system constructed in accordance with the invention.

Having briefly illustrated a user perspective of a system constructed in accordance with the invention, reference is now made to FIG. 6A, which is a block diagram that illustrates the top-level components in a system constructed in accordance with the preferred embodiment of the present invention. Specifically, the diagram of FIG. 6A is a logical diagram that illustrates components of a managed client, a management server, and a managed object. Logically, these are three separate devices. Physically, however, they may be implemented on a single computer, or may be implemented on separate physical computers. Indeed, in most instances, these devices will be provided on separate physical computers, consistent with the remote operation that is achieved and accommodated by the system of the present invention. By way of nomenclature, the managed client refers to the device that is utilized by a system administrator in performing the diagnosis and troubleshooting operations supported by the present invention. The management server refers to the device that executes the primary and principal components of the diagnostic software and routines of the present invention. Finally, the managed object refers to the device that is being diagnosed by the diagnosis software of the present invention.

In operation, the system administrator controls and directs the diagnosis software of the present invention through a user interface 102 provided on the managed client. Preferably, this user interface is provided in the form of a Web browser, such as Microsoft's Internet Explorer, Netscape Navigator, or virtually any other Web browser. Using this interface 102, the system administrator can point to the URL that provides the main menu (see FIG. 2) of diagnostic routines that may be performed by the present invention. This URL defines a Web page that may be retrieved by the Web server 130 that is run on the management server. In accordance with the preferred embodiment, the Web server is Microsoft's Internet Information Server. As is known by persons of ordinary skill in the art, this Web server may "serve up" Web pages to the browser 102. Further, the Web pages may either be static or dynamic, consistent with the broader concepts of the present invention. Indeed, in the preferred embodiment, the first or top-level Web page associated with the inventive diagnostic system is a static web page that contains a plurality of links to individual ASP scripts 132, each of which define a separate diagnostic routine. Each such diagnostic routine is preconfigured to diagnosis a class of problems of a managed object. The top-level Web page may be configured as a static HTML page, since the various ASP scripts for performing diagnostics are predefined, and therefore known. Thus, a static web page presenting this listing of possible diagnostic services may be readily presented to a user through the browser 102. The user may then readily select from the listing of diagnostic services presented on the browser, simply by pointing the mouse arrow to one of the diagnostic links, and then "clicking" on that link.

Although additional details of the preferred implementation will be discussed below, in short, once the user selects the diagnostic routine to be executed, the ASP script 132 instantiates a COM object 134 referred to herein as "diagnostic control." This object 134 contains the logic for solving a particular class of problems and it evaluates and solves these problems, in part, by collecting information. This information is collected from either the user (e.g., system administrator) or through a data gathering process carried out on the managed object (discussed further below). Information obtained from the user may be, as described above, information such as the identification of the device to be diagnosed. This information can be requested by presenting an HTML template 140 (see FIG. 7) to the user, like that illustrated in FIG. 3. The user may simply fill out the requested information, and the template may be communicated back to the diagnostic control 134. The second source of information (the data gathering process executed on the managed object) will be discussed in more detail below, in connection with FIG. 7.

Once the diagnostic control has received the requested information, it may create a report to present to the user that either identifies the problem, or at least identifies a significant number of steps that have been executed towards diagnosing the problem. This report will often provide a significant amount of information to the system administrator in deciding a "next step" in the diagnosis. As should be appreciated, the diagnostic control is, in essence, a large collection of "if/then" logical evaluations. These are the evaluations that have been predetermined to be necessary or desirable in carrying out the diagnosis of a particular class of problems.

With regard to the information gather process 150 that is carried out on the managed object, this is simply a process for gathering data that is requested by the diagnostic control 134 from the management server. The particular information requested will necessarily vary depending upon the particular class of problems that the diagnostic control 134 is seeking to diagnosis. In short, the information gathering process 150 receives a request from the diagnostic control 134 for certain information. The process 150 gathers this information from the managed node and responds with this information to the diagnostic control 134. Consistent with the broader concepts of the invention, the information gathering process may be one that is pre-installed on the various devices of a network, and either runs resident in memory, or is invokable by the diagnostic control 134. In accordance with the preferred embodiment, the diagnostic control 134 is implemented as a DCOM object, which, as is known by persons in the art, allows a COM object to be executed from a remote location. Accordingly, the information gathering process is preferably implemented as a COM object 150 (sometimes referred to herein as "data control").

In accordance with the preferred embodiment of the present invention, the data control 150 is not preinstalled on the various nodes of the network. This has several advantages in the preferred implementation. First, it eliminates the need for the system administrator to preinstall a relatively large amount of software on numerous machines. It also reduces the disk space requirements on the various machines, since in practice the diagnostic controls of the present invention will not need to be executed on most machines. Certainly, the entire suite of diagnostic controls will not likely ever be executed even on a single machine. Instead of installing the various data controls (and it will be appreciated that there may be a unique data control 150 for each diagnostic control 134 provided on the management server) on each managed node, a much smaller utility, referred to herein as "diagnostic installer" 152, is preinstalled on the various nodes of the network and runs resident in memory when the nodes are up and running.

The diagnostic installer is a sockets process. As is known, a sockets process is a process that runs on a system and monitors a well-known communications port (the socket). When the process detects a request over that socket, it must determine what the request is and how to handle it. The diagnostic installer 152 is configured to handle is configured to detect and handle a request to install software components on the managed node. In this regard, when the diagnostic installer 152 detects an install request from the management server, along with the request is the URL that indicates the location on the management server where the installation package can be obtained. The diagnostic installer uses this URL and obtains the package over HTTP. The package itself may be an "InstallShield" package. As is known, an InstallShield package is a self executable package. The package gets executed by the diagnostic installer 152 just as if a person were launching it manually. Programmatic launching of another application is relatively straightforward, and therefore need not be described herein. Once the package has executed, the diagnostic installer 152 reports the results (positive or negative, indicated by the package executable return code) to the management server. If all went well, the diagnosis continues, otherwise an error message may be displayed to the user at the management client. Further details of the diagnostic installer 152 need not be described herein in order to gain an appreciation for the present invention.

In the preferred embodiment, when the diagnostic control 134 seeks to gather data from the managed object, it first evaluates the managed object to determine whether the data control object 150 has been installed. If so, then the diagnostic control 134 may submit its information request to the data control 150, which may then gather the data and transmit the results (gathered data) back to the diagnostic control 134 for reporting to the user. In a Microsoft Windows implementation, the diagnostic control may make this evaluation by examining the registry of the managed object, to determine whether the appropriate data control object has been installed. If not, then the diagnostic control 134 may provide the network path name of the data control object to be installed to the diagnostic installer that is resident on the managed object. This diagnostic installer may then control the network installation of the data control onto the managed object. Thereafter, the diagnostic control 134 may request the particular gathering of data from the data control object, which gathers the data from the managed object and reports the gathered data to the diagnostic control 134.

Figure 6B:
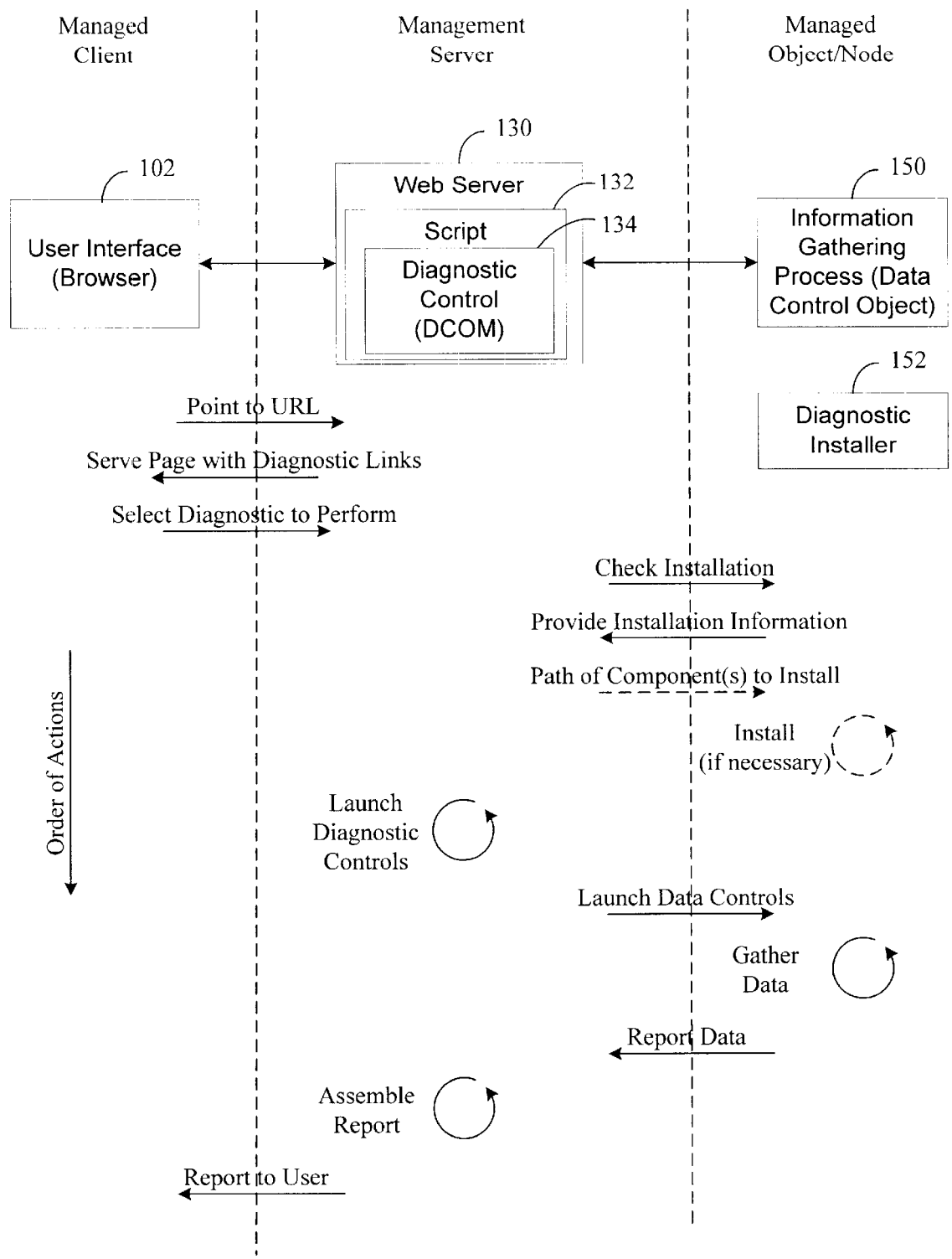

FIG. 6B illustrates the principal steps described above, which are associated with the diagnostics of the present invention. Specifically, the diagnostics are initiated by a user pointing a browser to the URL of the diagnostic routine. The Web page corresponding to this URL may be served up by the web server 130, by presenting a Web page to the browser 102 containing a plurality of dynamic links to ASP scripts. The user may then select the desired ASP script 132 (diagnostic control). Thereafter, the management server and the managed object intercommunicate, beginning when the ASP script 132 checks the installation of the appropriate data control object on the managed node. The managed node (through the diagnostic installer) reports back installation information to the ASP script 132. If the appropriate controls object has not been installed, then the ASP script 132 may provide the network path name of the component or components to be installed. Thereafter, the diagnostic installer may operate to perform whatever installation is necessary. Following that step, the ASP script launches the appropriate diagnostic controller 134. Thereafter, the diagnostic control 134 causes the data controls object 150 to be launched on the managed node. Then the managed node proceeds to gather the data requested by the diagnostic control, and reports that data back to the diagnostic control once it has been gathered. Thereafter, the diagnostic control may evaluate the data, or otherwise simply assemble a report that is then reported to the user on the managed client.

It is believed that the foregoing discussion is sufficient to enable persons skilled in the art to implement a system that carries out the concepts and teachings of the present invention. In this regard, it is understood that in any system implementation there will be a variety of implementation details. However, such details are not believed to be limiting upon the broader scope of the present invention. Notwithstanding, the following brief discussion will address several such implementation details that may be implemented on one embodiment of the present invention. Again, it should be understood that the broader concepts and teachings of the present invention should not be construed as limited by the discussion that follows.

Figure 7:
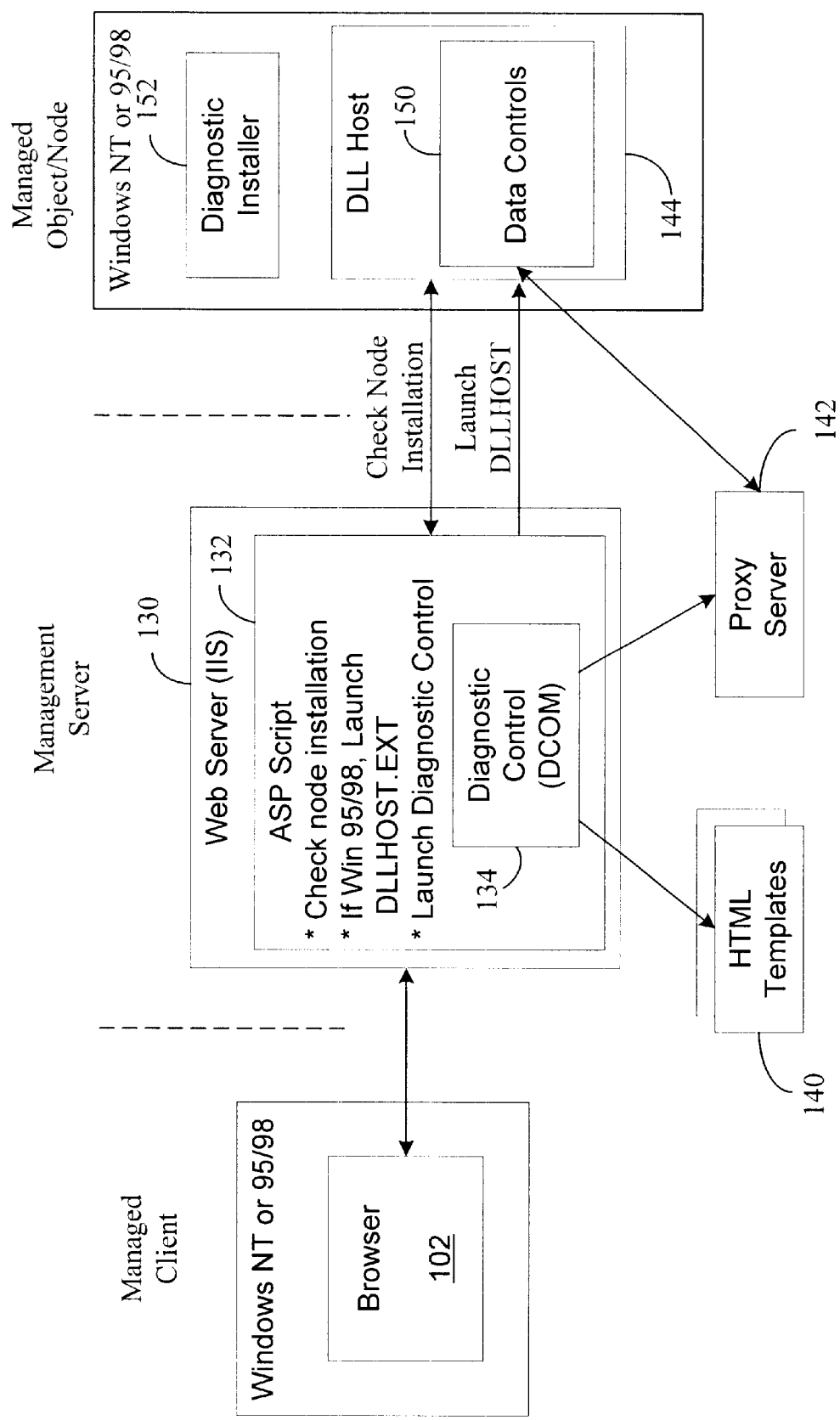
FIG. 7 is a block diagram similar to FIG. 6A, but illustrating additional components of a system constructed in accordance with one embodiment of the invention.

Reference is now made to FIG. 7, which is a block diagram similar to the diagram of FIG. 6A, but illustrating additional details of an implementation in a Windows environment. It should be appreciated that the present invention is not limited to a Windows operating environment, even though the Windows environment has been chosen for purposes of illustration herein.

The diagram of FIG. 7 illustrates the preferred embodiment of the present invention, wherein the managed client, the management server, and the managed node each operate under Windows (either NT or 95/98). With regard to the ASP script 132 on the management server, the process starts by the script 132 checking the software installation on the managed node. Preferably, this step is performed by evaluating the registry of the managed node. However, if the managed node is operating under an operating system other than Windows, then this step may be implemented in a different fashion. Thereafter, if the appropriate data controls 150 software is not installed on the managed node, then the managed node instructs the diagnostic installer 152 to install the necessary components. As previously described, this installation may be performed through a sockets process.

Once the components are installed, then the ASP script instructs the managed node to launch DLLHOST.EXE 144. As is known, DLLHOST.EXE is a surrogate process provided by Microsoft Windows, whose sole purpose is to host DLLs (i.e., provides a COM space for a DLL to run in). While DLLHOST.EXT is provided in both Windows 95/98 and Windows NT, it operates differently in each. Windows NT has the "intelligence" to launch DLLHOST.EXT, when necessary. However, in Windows 95/98, it must be launched manually. Therefore, the ASP script 132 determines whether the managed node is operating under Windows NT or Windows 95. This remote operating system verification may be performed by a remote registry lookup, in much the same way as the data control installation verification. If the managed node is operating under Windows 95/98, then the ASP script 132 provides an instruction to a sockets process 152 with the diagnostic installer 152, to launch DLLHOST.EXE.

In this regard, once it has been verified that the data control has been installed and that the managed node is not running Windows NT, a request is sent from the management server to the diagnostic installer 152 on the managed node. In addition to identifying the request as a DLLHOST.EXE launch (again, through a sockets process), the unique identifier associated with the data control that needs to be launched (e.g., the UUID—Universally Unique Identifier—or CLSID—for Class Identifier—are different names for this identifier) is passed with the request. The diagnostic installer 152 then simply programmatically launches the DLLHOST.EXE passing the identifier as a command line parameter to it. DLLHOST.EXE will then execute, look up the identifier in the registry, and load the data control DLL associated with that identifier into its memory space. The data control is then ready to receive requests for data.

For purposes of enhanced security, communications with the data controls DLL 150 are made by way of a proxy object 142. Upon initial software installation at the managed node, the managed node is configured such that only certain specified persons (users) have access to its resources, including the ability to launch the data controls DLL 150 of the present invention. When created at the management server, the proxy object 142 is launched as a predefined user, which has access privileges at the managed node. This significantly reduces security issues, that may otherwise arise due the remote diagnostic capabilities accommodated by the system of the present invention.

It should be appreciated that the proxy object 142 is not required on a system if all the managed nodes are running Windows NT. If, however, the managed nodes are running Windows 95/98, then the proxy object 142 (or a reasonable substitute thereof), will be implemented. The security that the proxy object 142 adds is a requirement of Windows 95/98. Specifically, Windows 95/98 allows only certain, specified (specified at install time) users to access its resources, and the proxy object 142 is one way of addressing this security requirement.

Having described a system, including various implementation details of a preferred embodiment, it will be appreciated that the present invention may be viewed a system that provides diagnostic capability in a semi-automated fashion. It should also be appreciated that the present invention may be embodied in a method for diagnosing or evaluating certain problems or potential problems in a network computer environment. In this regard, reference is made to FIG. 8, which is a flow chart 200 illustrating certain steps in a diagnostic method in accordance with one embodiment of the present invention. In this regard, and as discussed above, the method may begin by a user pointing a browser to a URL of a diagnostic package that exists on a management server (step 201). Thereafter, the user may be instructed to identify a given diagnostic routine that is to be performed (step 202). This step is preferably implemented by the system presenting a plurality of choices to the user of diagnostic routines that may be executed to trouble shoot or diagnose a particular class of problems. Thereafter, the user may be prompted to identify a particular machine or node that is to be diagnosed (step 204). The user may be further prompted to answer additional questions that may be desired or necessary in connection with a given diagnostic routine (step 206). The system of the present invention may then gather and assimilate diagnostic information, and then present that assimilated information to the user in a logical or coherent fashion. In this regard, the user receives and reviews the results (step 208). The user may then be prompted to indicate whether the problem has been properly diagnosed or whether a service call may need to be placed (step 210). If the user indicates that a service call is desirable, then the system may allow the user to instruct it as to the recipient of the service call (step 212). As will be appreciated, the diagnostic information all ready gathered may be communicated along with the service call, so that the technician that ultimately comes to service the managed node will have the benefit of the diagnostics that have already been executed on that device.

Figure 8:
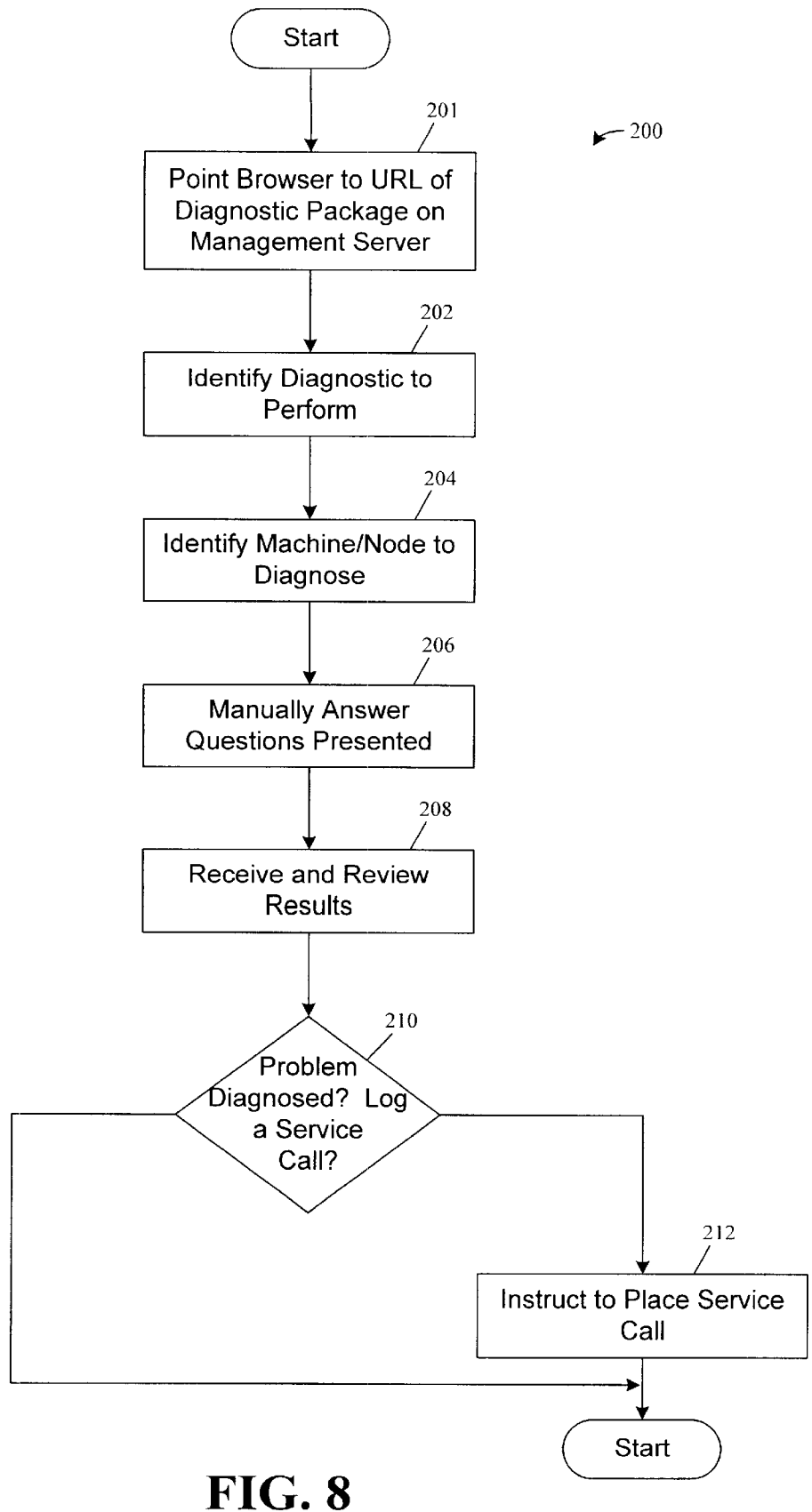
FIG. 8 is a flowchart illustrating the top-level functional operation of a system constructed in accordance with one embodiment of the invention.

The flow chart of FIG. 8 shows the architecture, functionality, and operation of a possible implementation of the diagnostic software of the present invention. In this regard, each block represents a module, segment, or portion of code, which comprises one or more executable instructions for implementing the specified logical function(s). It should also be noted that in some alternative implementations, the functions noted in the blocks may occur out of the order noted in FIG. 8. For example, two blocks shown in succession in FIG. 8 may in fact be executed substantially concurrently or the blocks may sometimes be executed in the reverse order, depending upon the functionality involved, as will be further clarified hereinbelow.

The program that provides the diagnostic software of the present invention, may comprise an ordered listing of executable instructions for implementing logical functions. This software may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for evaluating the operation of a managed object in a computer network environment comprising:

a management client executing a user interface;

a management server executing a Web server, the Web server configured to be capable of being invoked by the user interface, the management server further including software for dynamically serving data to the Web server, and at least one diagnostic control that defines a plurality of diagnostic steps to perform on a managed object; and a managed object, the managed object having data control software configured to collect data from the managed object in response to specific requests made by the diagnostic control, the data control software being further configured to report the collected data back to the diagnostic control over the computer network;

wherein the managed client, the management server, and the managed object are disposed for intercommunication across the computer network.

2. The system as defined in claim 1, wherein the user interface is a browser.

3. The system as defined in claim 1, wherein the Web server is Internet Information Server (IIS).

4. The system as defined in claim 1, wherein the software for dynamically serving data to the Web server includes at least one script prepared in a scripting language.

5. The system as defined in claim 4, wherein the scripting language is Active Server Page (ASP).

6. The system as defined in claim 4, wherein the management server includes an HTML page having at least one link to the at least one script, the Web page being configured to present the HTML page to the user interface, and the at least one script link being selectable by the user.

7. The system as defined in claim 1, wherein the managed client, the management server, and the managed object reside on separate computers.

8. The system as defined in claim 1, wherein the managed client, the management server, and the managed object reside on a single computer.

9. The system as defined in claim 1, wherein the management server further includes logic configured to determine whether the managed object has software installed to configure it to gather the data needed for a specified diagnostic control.

10. The system as defined in claim 9, wherein the management server further includes software configured to remotely install, on the managed object, the software needed to gather data for a specified diagnostic control, if the logic determines that the software is not presently installed on the managed object.

11. The system as defined in claim 9, wherein the logic is configured to evaluate a registry of the workstation of the managed object.

12. The system as defined in claim 1, wherein the management server includes a plurality of diagnostic controls, wherein each diagnostic control is uniquely designed for controlling the collection of data of a specified managed object to diagnose a specified class of problems.

13. The system as defined in claim 1, wherein the at least one diagnostic control is implemented using a component object module (COM).

14. The system as defined in claim 1, wherein the managed object includes data gathering software needed to gather data for a specified diagnostic control.

15. The system as defined in claim 14, wherein the data gathering software is implemented using a distributed component object module (DCOM).

16. The system as defined in claim 1, wherein the management server includes template generation software configured to generate at least one HITML template that may be communicated to the user interface, which HTML template presents at least one query to the user.

17. A method for evaluating the operation of a managed object in a computer network environment comprising the steps of:

executing a Web server on a management server;
   receiving a request for a specified Web page, the specified Web page containing at least one link to a script for controlling the performance of a diagnostic routine;
   instantiating a specified diagnostic routine, upon selection by a user of a link from the at least one link;
   communicating from the diagnostic routine, over a network to a managed object, requests for data;
   receiving, at the diagnostic routine, the collected data from the managed object; and
   presenting diagnostic results to the browser.

18. The method as defined in claim 17, further including the step of executing software at the managed object, the software configured to collect data in response to the requests received from the diagnostic routine.

19. The method as defined in claim 17, the step of receiving a request for a specified Web page includes receiving a request from a browser, the request being made by specifying a uniform resource locator (URL) that identifies the location of the specified Web page.

20. A method for evaluating the operation of a managed object in a computer network environment, comprising the steps of:

using a Web server to provide access to a plurality of diagnostic routines via a browser and a connection between the browser and the Web server; and
   utilizing a browser to select from a plurality of pre-defined diagnostic routines, which diagnostic routines request and receive data from a managed object, evaluate the received data and report results to the browser.

21. A computer readable medium containing program code for installation on at least one workstation in a system for evaluating the operation of a managed object in a computer network environment comprising:

at least one first segment of code for installation on a workstation implementing a management server executing a Web server, the Web server configured to be capable of being invoked by a browser executing from a remote location, the at least one first segment of code including at least one diagnostic control that defines a plurality of diagnostic steps to perform on a managed object; and
   at least one second segment of code for installation on a workstation implementing a managed object, the managed object configured to collect data from the managed object in response to specific requests made by the diagnostic control, the at least one second segment of code being further configured to report the collected data back to the diagnostic control over the computer network.

* * * * *